United States Patent
Vo et al.

(10) Patent No.: US 10,179,875 B2
(45) Date of Patent: Jan. 15, 2019

(54) FUNCTIONALIZED PROPPANT PARTICULATES FOR USE IN SUBTERRANEAN FORMATION CONSOLIDATION OPERATIONS

(71) Applicant: Halliburton Energy Services, Inc., Houston, TX (US)

(72) Inventors: Loan K Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/106,479

(22) PCT Filed: Mar. 24, 2014

(86) PCT No.: PCT/US2014/031542
§ 371 (c)(1),
(2) Date: Jun. 20, 2016

(87) PCT Pub. No.: WO2015/147775
PCT Pub. Date: Oct. 1, 2015

(65) Prior Publication Data
US 2016/0340574 A1    Nov. 24, 2016

(51) Int. Cl.
*E21B 43/267* (2006.01)
*C09K 8/80* (2006.01)
*E21B 43/26* (2006.01)

(52) U.S. Cl.
CPC .............. *C09K 8/805* (2013.01); *C09K 8/80* (2013.01); *E21B 43/26* (2013.01); *E21B 43/267* (2013.01)

(58) Field of Classification Search
CPC .......... E21B 43/267; C09K 8/80; C09K 8/805
See application file for complete search history.

(56) References Cited

U.S. PATENT DOCUMENTS

| | | |
|---|---|---|
| 5,330,836 A | 7/1994 | Buese et al. |
| 6,214,928 B1 | 4/2001 | Craig et al. |
| 7,267,171 B2 | 9/2007 | Dusterhoft et al. |

(Continued)

FOREIGN PATENT DOCUMENTS

| | | |
|---|---|---|
| EP | 2092039 | 8/2009 |
| WO | WO 2008/088449 A2 | 7/2008 |
| WO | 20150147775 A1 | 10/2015 |

OTHER PUBLICATIONS

Gelest-Silane Coupling Agents (2006).*
International Search Report and Written Opinion for PCT/US2014/031542 dated Dec. 10, 2014.

*Primary Examiner* — Angela M DiTrani Leff
*Assistant Examiner* — Avi T Skaist
(74) *Attorney, Agent, or Firm* — McGuireWoods LLP

(57) ABSTRACT

Methods including preparing a treatment fluid comprising an aqueous base fluid, functionalized proppant particulates, and a curing agent, wherein the functionalized proppant particulates comprise proppant particulates having a functional group hydrolytically deposited thereon; introducing the treatment fluid into a subterranean formation having at least one fracture therein; placing the functionalized proppant particulates into the at least one fracture; and reacting the curing agent with the functional group on the functionalized proppant particulates, thereby forming a consolidated proppant pack in the at least one fracture.

9 Claims, 1 Drawing Sheet

(56) References Cited

U.S. PATENT DOCUMENTS

| | | | |
|---|---|---|---|
| 7,490,667 B2* | 2/2009 | Sinclair | C09K 8/805 166/278 |
| 8,168,570 B2 | 5/2012 | Barron et al. | |
| 2007/0036977 A1* | 2/2007 | Sinclair | C09K 8/805 428/403 |
| 2007/0277978 A1* | 12/2007 | Reddy | C09K 8/5086 166/276 |
| 2009/0264323 A1* | 10/2009 | Altherr | C09K 8/80 507/221 |
| 2010/0092686 A1 | 4/2010 | Laryea et al. | |
| 2011/0033709 A1 | 2/2011 | Killilea et al. | |
| 2011/0190420 A1 | 8/2011 | Nagelsdiek et al. | |
| 2011/0306723 A1 | 12/2011 | Choffat | |
| 2014/0076558 A1* | 3/2014 | Nguyen | C09K 8/68 166/280.2 |
| 2014/0076559 A1 | 3/2014 | Ogle et al. | |
| 2014/0144631 A1 | 5/2014 | Weaver et al. | |

* cited by examiner

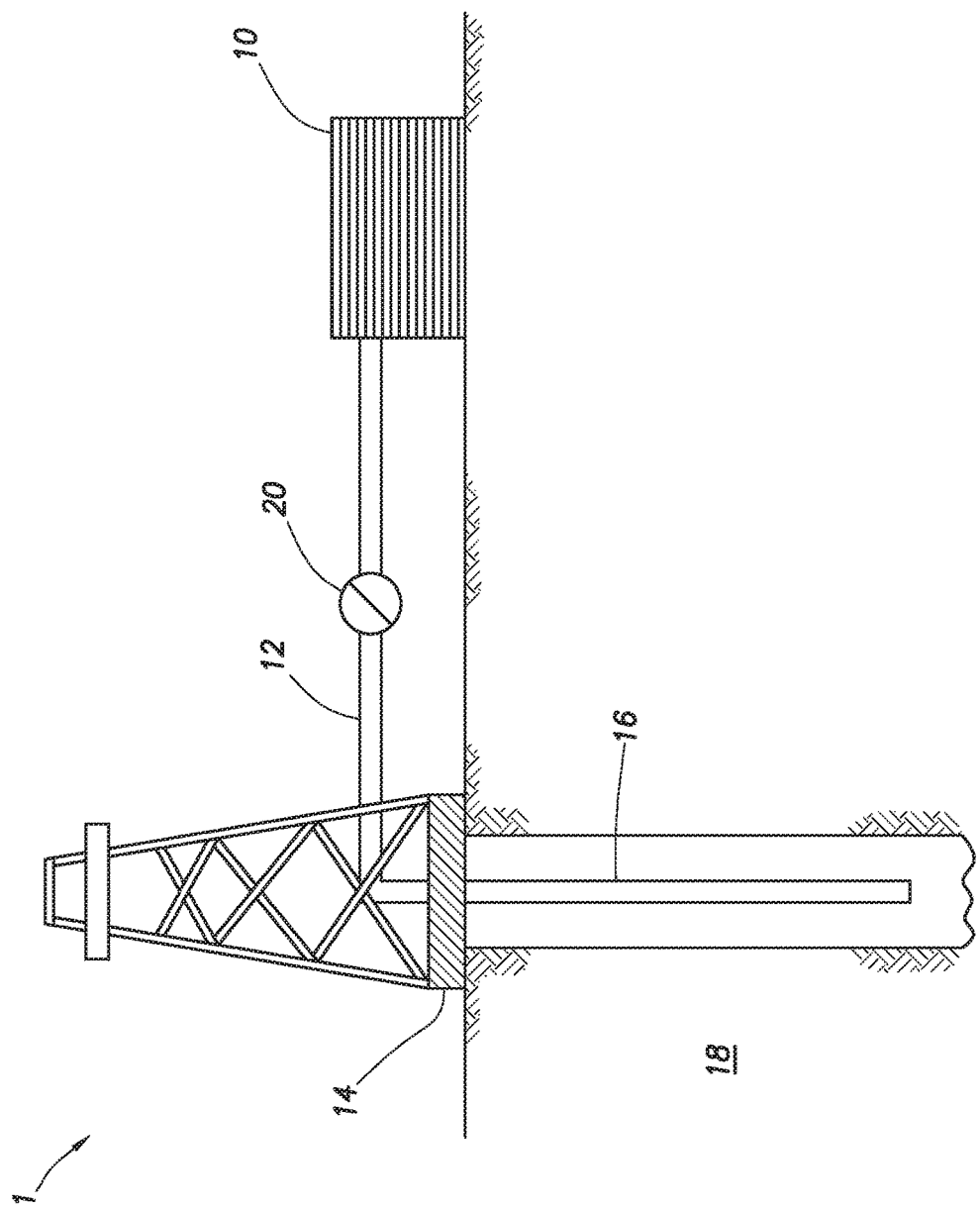

FUNCTIONALIZED PROPPANT PARTICULATES FOR USE IN SUBTERRANEAN FORMATION CONSOLIDATION OPERATIONS

BACKGROUND

The embodiments herein relate to subterranean formation operations and, more particularly, to the use of functionalized proppant particulates in subterranean formation consolidation operations.

Subterranean wells (e.g., hydrocarbon producing wells, gas producing wells, water producing wells, and the like) are often stimulated by hydraulic fracturing treatments. In traditional hydraulic fracturing treatments, a treatment fluid, which may also function simultaneously or subsequently as a carrier fluid, is pumped into a portion of a subterranean formation (which may also be referred to herein as "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") serve to prevent the fractures from fully closing once the hydraulic pressure is removed. By keeping the fractures from fully closing, the proppant particulates aid in forming conductive paths through which fluids produced from the formation flow, referred to as a "proppant pack." The degree of success of a stimulation operation depends, at least in part, upon the porosity of the proppant pack to permit the flow of fluids through the interconnected interstitial spaces between abutting proppant particulates.

The flowback of the proppant particulates from the proppant pack in the fracture may be undesirable. Such flowback of the proppant particulates may decrease the productivity of the well due to fracture closure (i.e., the proppant pack is no longer capable of withstanding fracture closure pressures), and because such flowback may erode metal equipment, plug piping and vessels, or cause damage to valves, instruments, and other production equipment. One method used to prevent flowback of the proppant particulates forming a proppant pack is to coat the proppant particulates with a hardenable resin, which may be precoated onto the proppant particulates or coated thereon on-the-fly. As used herein, the term "on-the-fly" refers to performing an operation during a subterranean treatment that does not require stopping normal operations. The hardenable resin composition may bring about the consolidation of the proppant particulates into a hard, permeable mass having compressive and tensile strength that may be capable of preventing the proppant particulates from flowing out of the fracture.

Hardenable resins are typically two-part resin systems formed from a curable resin and a hardening agent. As such, either both portions must be coated onto the proppant particulates or both portions must be otherwise contacted with the proppant particulates (e.g., in the treatment fluid) to ensure curing. The curable resin and the hardening agent may react and form a hardenable resin capable of consolidating proppant particulates, however, secondary conditions such as temperature, closure stress, and other factors often dictate the success of any such consolidation.

BRIEF DESCRIPTION OF THE DRAWINGS

The following FIGURES are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the treatment fluids of the embodiments described herein to a downhole location.

DETAILED DESCRIPTION

The embodiments herein relate to subterranean formation operations and, more particularly, to the use of functionalized proppant particulates in subterranean formation consolidation operations.

Although some embodiments described herein are illustrated by reference to hydraulic fracturing treatments, the functionalized proppant particulates disclosed herein may be used in any subterranean formation operation that may benefit from their consolidation properties. Such treatment operations may include, but are not limited to, a drilling operation; a stimulation operation; an acidizing operation; an acid-fracturing operation; a sand control operation; a fracturing operation; a frac-packing operation; a remedial operation; a near-wellbore consolidation operation; and any combination thereof.

Moreover, the functionalized proppant particulates described herein may be used in any non-subterranean operation that may benefit from their consolidation properties. Such operations may be performed in any industry including, but not limited to, oil and gas, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, the present disclosure provides a method comprising preparing a treatment fluid comprising an aqueous base fluid, functionalized proppant particulates, and a curing agent. The functionalized proppant particulates comprise proppant particulates having a functional group hydrolytically deposited thereon. The treatment fluid may be introduced into a subterranean formation having at least one fracture therein. The fracture may be a naturally-occurring fracture or a fracture created intentionally, such as by introducing a pad fluid into the subterranean formation at a rate and pressure to create the at least one fracture. The functionalized proppant particulates may then be placed into the at least one fracture, where the curing agent and the functional group on the functionalized proppant particulates react, so as to form a consolidated proppant pack. As used herein, the term "consolidated proppant pack" refers to a proppant pack that is formed into an agglomerated mass of proppant particulates that does not generally become individual proppant particulates without the application of shear, and which is capable of substantially preventing the flowback of the individual proppant particulates therefrom. The consolidated proppant pack may additionally be capable of retarding the flow of loose particulates in the subterranean formation (e.g., formation fines or other sand particles) from flowing to the surface.

In some embodiments, the treatment fluid may be pre-mixed prior to use at the well site. In yet other embodiments, the treatment fluid may be prepared on-the-fly at the well site. For example, either or both of the functionalized proppant particulates or the curing agent may be flowed into the aqueous base fluid as the aqueous base fluid is being introduced into the subterranean formation, thereby forming the treatment fluid on-the-fly. That is, the aqueous base fluid may receive both of the functionalized proppant particulates and the curing agent on-the-fly; the aqueous base fluid and the functionalized proppant particulates may be pre-mixed and the curing agent added thereto on-the-fly; or the aqueous base fluid and the curing agent may be pre-mixed and the functionalized proppant particulates added thereto on-the-fly.

In some embodiments, the functionalized proppant particulates may be delayed from reacting with the curing agent in the treatment fluid, so as to prevent clustering or aggregating of the proppant particulates upon reacting with the curing agent. In such embodiments, the curing agent may become reactive after undergoing some reaction. In other embodiments, the curing agent may itself be a delayed curing agent that does not immediately react, or only relatively slowly, reacts with the functionalized proppant particulates to begin consolidation. In yet other embodiments, either or both of the curing agent and the functionalized proppant particulates may be encapsulated with a coating (e.g., an aqueous dissolving coating) that may degrade or otherwise be removed under downhole conditions (e.g., temperature, pH, salinity, and the like) or that may permit diffusion of the curing agent such that it comes into contact with the functional groups on the functionalized proppant particulates and causes consolidation. Such coatings may be any coating capable of encapsulating the curing agent and/or the functionalized proppant particulates and delaying the reaction of the curing agent and the functional groups on the functionalized proppant particulates. In some embodiments, the coating may be a polymeric coating. In other embodiments, the coating may be an aqueous dissolvable material (e.g., a salt, a hydrolysable polymer, or any other aqueous dissolvable material).

In some embodiments, the functionalized proppant particulates and the curing agent may be introduced into the subterranean formation in separate treatment fluids. Such embodiments may permit the separate treatment fluids to be pre-formed prior to arrival at the well site, for example, or may ensure that the curing agent and the functional group on the functionalized proppant particulates do not react until a desired time (i.e., upon being introduced into the subterranean formation or upon placing the functionalized proppant particulates into a fracture). In such embodiments, the present disclosure provides a method of preparing a first treatment fluid comprising a first aqueous base fluid and functionalized proppant particulates. The functionalized proppant particulates comprise proppant particulates having a functional group hydrolytically deposited thereon. A second treatment fluid is prepared comprising a second aqueous base fluid and a curing agent. The first treatment fluid is introduced into a subterranean formation having at least one fracture therein and the functionalized proppant particulates are placed into the at least one fracture. The second treatment fluid may then be introduced into the subterranean formation, so as to contact and react the curing agent in the second treatment fluid with the functional group on the functionalized proppant particulates, thereby forming a consolidated proppant pack in the at least one fracture. As used herein, the term "treatment fluid" will be used collectively to refer to all of the treatment fluids disclosed in the present disclosure, including the treatment fluid comprising both the functionalized proppant particulates and the curing agent, the first treatment fluid comprising only the functionalized proppant particulates, and the second treatment fluid comprising only the curing agent.

The functional group may be hydrolytically deposited onto the proppant particulates by any means known by those of skill in the art. Generally, a functional group(s) may be selected such that they hydrolytically react with the substrate surface of the proppant particulates, thereby chemically coupling the functional group(s) to the proppant particulate and forming the functionalized proppant particulates described herein. That is, the functional group may react with hydroxyl groups on the surface of the proppant particulates, thereby coupling the functional group to the proppant particulate by hydrolytic deposition (i.e., a condensation reaction). In one embodiments, for example, the functional group may be a $Si(OMe)_3$ functional group, which may react with hydroxyl groups on the surface of the proppant particulates, thereby displacing and eliminating methanol and forming the covalent siloxane bond Si—O—Si. One of ordinary skill in the art, with the benefit of this disclosure, will recognize the method for chemically adhering the functional groups to the proppant particulates disclosed herein.

The functional groups selected for forming the functionalized proppant particulates described in the present disclosure may be any functional group capable of chemically adhering to a proppant particulate. In some embodiments, suitable functional groups may include, but are not limited to, an epoxy silane group, an amine silane group, an acrylyl silane group, and any combination thereof. That is, a single proppant particulate may have one or more of the same type of functional group chemically adhered thereto, or may have one or more different types of functional groups chemically adhered thereto.

The functional group(s) and the curing agent(s) are selected to react together to allow the functionalized proppant particulates to form a consolidated proppant pack in a fracture in a subterranean formation. Any suitable combination of functional group and curing agent may be used in accordance with the methods described herein. One of ordinary skill in the art, with the benefit of this disclosure, will recognize the combination of one or more functional groups and one or more curing agents to achieve a desired consolidated proppant pack with the functionalized proppant particulates.

In some embodiments, the functional group selected may be an epoxy silane group. Any epoxy silane group suitable for use in a subterranean formation operation, capable of chemically adhering to a proppant particulate, and reacting with a curing agent to form a consolidated proppant pack may be used in the methods of the present disclosure. Examples of suitable epoxy silane groups for use in the embodiments described herein may include, but are not limited to, 3-glycidoxypropyltrimethoxysilane, 3-glycidoxypropyltriethoxysilane, 3-glycidoxypropyltrimethoxysilane, 3-glycidoxypropylmethyldiethoxysilane, 3-glycidoxypropylmethyldimethoxysilane, 2-(3,4-epoxycyclohyxyl)-ethyltrimethoxysilane, 2-(3,4-epoxycyclohexyl)-ethyltriethoxysilane, 5,6-epoxyhexyltriethoxysilane, and any combination thereof.

In those embodiments in which an epoxy silane group is selected as one or more of the functional groups for forming the functionalized proppant particulates of the present disclosure, any curing agent capable of reacting with the epoxy silane group to permit consolidation of the functionalized proppant particulates may be used in accordance with the embodiments disclosed herein. Examples of suitable curing agents for use with proppant particulates functionalized with the epoxy silane functional groups may include, but are not limited to, a polyamine, a polyimine, a hydrophobically modified polyimine, a dimer acid, a trimer acid, a dimer diamine, an amine silane, a polyol, and any combination thereof.

In some embodiments, the functional group selected for forming the functionalized proppant particulates may be an amine silane group. Any amine silane group suitable for use in a subterranean operation, capable of chemically adhering to a proppant particulate, and reacting with a curing agent to form a consolidated proppant pack may be used in accordance with the methods provided herein. Examples of suitable amine silane groups for use in forming the functionalized proppant particulates of the present disclosure may include, but are not limited to, N-[3-(trimethoxysilyl)propyl]ethylenediamine, N-(2)-aminoethyl)-3-aminopropyltriethoxysilane, N-(6-aminohexyl)aminomethyltriethoxysilane, N-(6-aminohexyl)aminopropyltrimethoxysilane, N-(2-aminoethyl)-11-aminoundecyltrimethoxysilane, (aminoethylaminomethyl)phenethyltrimethoxysilane, N-3-[(amino(polypropylenoxy)]aminopropyltrimethoxysilane, 3-aminopropyltriethoxysilane, 3-aminopropyltrimethoxysilane, 4-aminobutyltriethoxysilane, m-aminophenyltrimethoxysilane, p-aminophenyltrimethoxysilane, aminophenyltrimethoxysilane, 3-aminopropyltris(methoxyethoxyethoxy)silane, 11-aminoundecyltriethoxysilane, 3-(m-aminophenoxy)propyltrimethoxysilane, aminopropylsilanetriol, 3-aminopropylmethydiethoxysilane, 3-aminopropyldiisopropylethoxysilane, 3-aminopropyldimethoylthoxysilane, N-(2-aminoethyl)-3-aminopropyl-silanetriol, N-(2-aminoethyl)-3-aminopropylmethyl-dimethoxysilane, N-(2-aminoethyl)-3-aminoisobutyl-methyldimethoxysilane, (aminoethylamino)-3-isobutyl-dimethylmethoxysilane, n-butylaminopropyltrimethoxysilane, n-ethylaminoisobutyltrimethoxysilane, n-methylaminopropyltrimethoxysilane, n-phenylaminopropyltrimethoxysilane, n-phenylaminopropyltrimethoxysilane, 3-(N-allylamino)propyltrimethoxysilane, (cyclohexylaminomethyl)triethoxysilane, N-cyclohexylaminopropyltrimethoxysilane, N-ethylaminoisobutylmethyldiethoxysilane, (phenylaminomethyl)methyldimethoxysilane, N-phenylaminomethyltriethoxysilane, N-methylaminopropylmethyldimethoxysilane, diethylaminomethyltriethoxysilane, (N, N-diethyl-3-aminopropyl)trimethoxysilane, 3-(N,N-dimethylaminopropyl)trimethoxysilane, (2-N-benzylaminoethyl)-3-aminopropyltrimethoxysilane, bis(triethoxysilylpropyl)amine, bis(trimethoxysilylpropyl)amine, bis[3-trimethoxysilyl)propyl]-ethylenediamine, bis[(3-trimethoxysilyl)propyl]-ethylenediamine, bis(methyldiethoxysilylpropyl)amine, bis(methyldimethoxysilylpropyl)-N-methylamine, and any combination thereof.

In those embodiments in which an amine silane group is selected as one or more of the functional groups for forming the functionalized proppant particulates of the present disclosure, any curing agent capable of reacting with the amine silane group to permit consolidation of the functionalized proppant particulates may be used in accordance with the embodiments disclosed herein. Examples of suitable curing agents for use with proppant particulates functionalized with the amine silane functional groups may include, but are not limited to, polyepoxy (e.g., a bisphenol A), an epoxy silane, and any combination thereof.

In some embodiments, the functional group selected may be an acrylyl silane group. Any acrylyl silane group suitable for use in a subterranean formation operation, capable of chemically adhering to a proppant particulate, and reacting with a curing agent to form a consolidated proppant pack may be used in the methods of the present disclosure. Suitable acrylyl silane groups for use in the embodiments described herein may include, but are not limited, an acrylamide silane, an N-alkylacrylamide silane, an acrylate silane, and any combination thereof. Specific examples of suitable acrylyl silane groups may include, but are not limited to, (3-acryloxypropyl)trimethoxysilane, methacryloxypropyltrimethoxysilane, N-(3-acryloxy-2-hydroxypropyl)-3-aminopropyltriethoxysilane, O-(methacryloxyethyl)-N-(triethoxy-silylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropyltriethoxysilane, (3-acryloxypropyl)methyldimethoxysilane, (methacryloxymethyl)methyldiethoxysilane, (methacryloxymethyl)methyldimethoxysilane, (methacryloxypropyl)methyldiethoxysilane, (methacryloxypropyl)methyldimethoxysilane, (methacryloxypropyl)dimethylethoxysilane, (methacryloxypropyl)dimethylmethoxysilane, and any combination thereof.

In those embodiments in which an acrylyl silane group is selected as one or more of the functional groups for forming the functionalized proppant particulates of the present disclosure, any curing agent capable of reacting with the acrylyl silane group to permit consolidation of the functionalized proppant particulates may be used in accordance with the embodiments disclosed herein. An example of a suitable curing agent for use with proppant particulates functionalized with the acrylyl silane functional groups may include, but is not limited to, a radical initiator. Suitable radical initiators may include, but are not limited to, an azo compound, a persulfate salt, a peroxide, a hydroperoxide, and any combination thereof. Suitable azo polymerization initiators may include, but are not limited to, 2,2'-azobis(2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Suitable persulfate salts may include, but are not limited to, ammonium persulfate, sodium persulfate, potassium persulfate, and any combination thereof. Suitable peroxides may include, but are not limited to, an alkaline earth metal peroxide, a zinc peroxide, a hydrogen peroxide, and any combination thereof. Suitable hyperoxides may include, but are not limited to, a cumene hydroperoxide, a tert-butyl hydroperoxide, formic peracid, hydroxymethyl hydroperoxide, 1-hydroxylethyl hydroperoxide, chloroformic peracid, tert-amyl hydroperoxide, and any combination thereof.

The functional groups may be chemically adhered to the proppant particulates in an amount sufficient to react with the curing agent and consolidate the functionalized proppant particulates into a consolidated proppant pack. In some embodiments, the functional groups may present in an amount of from a lower limit of about 1 group to an upper limit of saturation (i.e., the maximum number of functional groups that may be chemically adhered to a proppant particulate) on a single proppant particulate, and encompassing any value and any subset therebetween. In other embodiments, the functional groups may be present on the proppant particulates in an amount of from a lower limit of about 1 group, 2 groups, 3 groups, 4 groups, and 5 groups to an upper limit of about 10 groups, 9 groups, 8 groups, 7 groups, 6 groups, and 5 groups on a single proppant particulate.

The curing agent may be present in the treatment fluids described herein in an amount sufficient to react with the functional groups on the functionalized proppant particulates. In some embodiments, the curing agent may be present in the treatment fluid in an amount in the range of from a lower limit of about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to an upper limit of about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the functionalized proppant particulates, and encompassing any value and any subset therebetween. When the functionalized proppant particulates are provided in a first treatment fluid and the curing agent is provided in a second treatment fluid, the amount of curing agent may be determined based on the weight of the functionalized proppant particulates in the first treatment fluid.

The proppant particulates for use in forming the functionalized proppant particulates of the embodiments described herein may be formed from any material capable for use in a subterranean formation fracturing operation (e.g., capable of withstanding fracture closure pressures) and capable of chemically adhering the functional groups described herein. In some embodiments, suitable materials for these proppant particulates may include, but are not limited to, sand, bauxite, ceramic materials, glass materials, polymer materials (e.g., ethylene vinyl acetate or composite materials), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles for use in conjunction with the present disclosure may be any known shape of material, including substantially spherical materials, fibrous materials, polygonal materials (such as cubic materials), and combinations thereof.

In preferred embodiments, the proppant particulates may be made from a material including, but not limited to, silica, quartz, a glass particulate, aluminum, an alumino-silicate (e.g., a clay), silicon, copper, tin, talc, an inorganic oxide (e.g., iron oxide, titanium dioxide, chromium(III) oxide, and the like), steel, iron, asbestos, nickel, zinc, marble, chalk, gypsum, barium sulfate, graphite, carbon black, and any combination thereof. Such preferred materials may additionally comprise a binder for forming composite proppant particulates.

The proppant particulates suitable for use in the methods of the present disclosure may be of any size and shape combination known in the art as suitable for use in a fracturing operation. Generally, where the chosen proppant particulate is substantially spherical, and may have a size in the range of from a lower limit of about 2 mesh, 20 mesh, 40 mesh, 60 mesh, 70 mesh, 80 mesh, 100 mesh, 120 mesh, 140 mesh, 160 mesh, 180 mesh, and 200 mesh to an upper limit of about 400 mesh, 380 mesh, 360 mesh, 340 mesh, 320 mesh, 300 mesh, 280 mesh, 260 mesh, 240 mesh, 220 mesh, and 200 mesh, U.S. Sieve Series, and encompassing any value and any subset therebetween. In some embodiments, the proppant particulates described herein may be smaller than 400 mesh (e.g., may be as small as about 4800 mesh, an estimated sieve size equaling about 2 microns, or even smaller). In some embodiments, the proppant particulates may have a size in the range of from about 8 to about 120 mesh, U.S. Sieve Series. A major advantage of using this method is there is no need for the proppant particulates to be sieved or screened to a particular particle mesh size or particular particle size distribution, but rather a wide or broad particle size distribution can be used.

In some embodiments, it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates may be generally sized such that the longest axis is from a lower limit of about 0.02 inches ("in"), 0.04 in, 0.06 in, 0.08 in, 0.1 in, 0.12 in, 0.14 in, and 0.16 in to an upper limit of about 0.3 in, 0.28 in, 0.26 in, 0.24 in, 0.22 in, 0.2 in, 0.18 in, and 0.16 in in length, and encompassing any value and any subset therebetween. In other embodiments, the longest axis is from about 0.05 inches to about 0.2 inches in length. In one embodiment, the substantially non-spherical proppant particulates may be cylindrical, having an aspect ratio of about 1.5 to 1, a diameter of about 0.08 in, and a length of about 0.12 in. In another embodiment, the substantially non-spherical proppant particulates may be cubic, having sides of about 0.08 inches in length. The use of substantially non-spherical proppant particulates may be desirable in some embodiments because, among other things, they may provide a lower rate of settling when slurried into the treatment fluids described herein. By so resisting settling, substantially non-spherical proppant particulates may provide improved proppant particulate distribution as compared to more spherical proppant particulates. It will be appreciated by one of skill in the art, however, that any combination of spherical and non-spherical proppant particulates may be used for forming functionalized proppant particulates described in some embodiments herein, without departing from the scope of the present disclosure.

The embodiments herein may comprise a treatment fluid comprising an aqueous base fluid. Aqueous base fluids suitable for use in the treatment fluids of the embodiments of the present disclosure may comprise fresh water, saltwater (e.g., water containing one or more salts dissolved therein), brine (e.g., saturated salt water), seawater, formation water (e.g., water that occurs naturally within the pores of a subterranean formation), produced water (e.g., water produced from a wellbore to the surface), or combinations thereof. Generally, the water may be from any source, provided that it does not contain components that might adversely affect the stability and/or performance of the first treatment fluids or second treatment fluids of the embodiments of the present invention.

In certain embodiments, the density of the aqueous base fluid may be adjusted, among other purposes, to provide additional transport and suspension to the functionalized proppant particulates in the treatment fluids used in the methods of the embodiments of the present disclosure. In certain embodiments, the pH of the aqueous base fluid may be adjusted (e.g., by a buffer or other pH adjusting agent), among other purposes, to activate a crosslinking agent and/or to reduce the viscosity of the first treatment fluid (e.g., activate a breaker, deactivate a crosslinking agent, and the like). In these embodiments, the pH may be adjusted to a specific level, which may depend on, among other factors, the types of additives included in the treatment fluid. One of ordinary skill in the art, with the benefit of this disclosure, will recognize when such density and/or pH adjustments are appropriate. In some embodiments, the pH range may preferably be from about 4 to about 11.

In some embodiments, the treatment fluids of the present disclosure may further comprise an additive selected from the group consisting of a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a crosslinker, a stabilizer, a chelating agent, a scale inhibitor, a gas hydrate inhibitor, an oxidizer, a reducer, a friction reducer, a clay stabilizing agent, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering the treatment fluids described herein, components of the treatment fluid may be delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture gradient of the subterranean formation, but it may also be used in cases where fracturing is not desired. In some embodiments, the high pressure pump may be capable of fluidly conveying particulate matter, such as the non-degradable particulates, the degradable particulates, and the proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 1 shows an illustrative schematic of a system that can deliver the treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments herein include:

A. A method comprising: preparing a treatment fluid comprising an aqueous base fluid, functionalized proppant particulates, and a curing agent, wherein the functionalized proppant particulates comprise proppant particulates having a functional group hydrolytically deposited thereon; introducing the treatment fluid into a subterranean formation having at least one fracture therein; placing the functionalized proppant particulates into the at least one fracture; and reacting the curing agent with the functional group on the functionalized proppant particulates, thereby forming a consolidated proppant pack in the at least one fracture.

B. A method comprising: preparing a first treatment fluid comprising a first aqueous base fluid and functionalized proppant particulates, wherein the functionalized proppant particulates comprise proppant particulates having a functional group hydrolytically deposited thereon; preparing a second treatment fluid comprising a second aqueous base fluid and a curing agent; introducing the first treatment fluid into a subterranean formation having at least one fracture therein and placing the functionalized proppant particulates into the at least one fracture; introducing the second treatment fluid into the subterranean formation; and reacting the curing agent with the functional group on the functionalized proppant particulates, thereby forming a consolidated proppant pack in the at least one fracture.

Each of embodiments A and B may have one or more of the following additional elements in any combination:

Element 1: Wherein the functional group selected from the group consisting of an epoxy silane group, an amine silane group, an acrylyl silane group, and any combination thereof.

Element 2: Wherein the functional group is an epoxy silane group and the curing agent is selected from the group consisting of a polyamine, a polyimine, a hydrophobically modified polyimine, a dimer acid, a trimer acid, a dimer diamine, an amine silane, a polyol, and any combination thereof.

Element 3: Wherein the epoxy silane group is selected from the group consisting of a 3-glycidoxypropyltrimethoxysilane, 3-glycidoxypropyltriethoxysilane, 3-glycidoxypropyltrimethoxysilane, 3-glycidoxypropylmethyldiethoxysilane, 3-glycidoxypropylmethyldimethoxysilane, 2-(3,4-epoxycyclohyxyl)-ethyltrimethoxysilane, 2-(3,4-epoxycyclohexyl)-ethyltriethoxysilane, 5,6-epoxyhexyltriethoxysilane, and any combination thereof.

Element 4: Wherein the functional group is an amine silane group and the curing agent is selected from the group consisting of a polyepoxy, an epoxy silane, and any combination thereof.

Element 5: Wherein the amine silane group is selected from the group consisting of N-[3-(trimethoxysilyl)propyl]ethylenediamine, N-(2)-aminoethyl)-3-aminopropyltriethoxysilane, N-(6-aminohexyl)aminomethyltriethoxysilane, N-(6-aminohexyl)aminopropyltrimethoxysilane, N-(2-aminoethyl)-11-aminoundecyltrimethoxysilane, (aminoethylaminomethyl)phenethyltrimethoxysilane, N-3-[(amino(polypropylenoxy)]aminopropyltrimethoxysilane, 3-aminopropyltriethoxysilane, 3-aminopropyltrimethoxysilane, 4-aminobutyltriethoxysilane, m-aminophenyltrimethoxysilane, p-aminophenyltrimethoxysilane, aminophenyltrimethoxysilane, 3-aminopropyltris(methoxyethoxyethoxy)silane, 11-aminoundecyltriethoxysilane, 3-(m-aminophenoxy)propyltrimethoxysilane, aminopropylsilanetriol, 3-aminopropylmethydiethoxysilane, 3-aminopropyldiisopropylethoxysilane, 3-aminopropyldimethoylthoxysilane, N-(2-aminoethyl)-3-aminopropyl-silanetriol, N-(2-aminoethyl)-3-aminopropylmethyl-dimethoxysilane, N-(2-aminoethyl)-3-aminoisobutyl-methyldimethoxysilane, (aminoethylamino)-3-isobutyl-dimethylmethoxysilane, n-butylaminopropyltrimethoxysilane, n-ethylaminoisobutyltrimethoxysilane, n-methylaminopropyltrimethoxysilane, n-phenylaminopropyltrimethoxysilane, n-phenylaminopropyltrimethoxysilane, 3-(N-allylamino)propyltrimethoxysilane, (cyclohexylaminomethyl)triethoxysilane, N-cyclohexylaminopropyltrimethoxysilane, N-ethylaminoisobutylmethyldiethoxysilane, (phenylaminomethyl)methyldimethoxysilane, N-phenylaminomethyltriethoxysilane, N-methylaminopropylmethyldimethoxysilane, diethylaminomethyltriethoxysilane, (N, N-diethyl-3-aminopropyl)trimethoxysilane, 3-(N,N-dimethylaminopropyl)trimethoxysilane, (2-N-benzylaminoethyl)-3-aminopropyltrimethoxysilane, bis(triethoxysilylpropyl)amine, bis(trimethoxysilylpropyl)amine, bis[3-trimethoxysilyl)propyl]-ethylenediamine, bis[(3-trimethoxysilyl)propyl]-ethylenediamine, bis(methyldiethoxysilylpropyl)amine, bis(methyldimethoxysilylpropyl)-N-methylamine, and any combination thereof.

Element 6: Wherein the functional group is an acrylyl silane group and the curing agent is selected from the group consisting of a radical initiator.

Element 7: Wherein the acrylyl silane group is selected from the group consisting of an acrylamide silane, an N-alkylacrylamide silane, an acrylate silane, (3-acryloxypropyl)trimethoxysilane, methacryloxypropyltrimethoxysilane, N-(3-acryloxy-2-hydroxypropyl)3-aminopropyltriethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropyltriethoxysilane, (3-acryloxypropyl)methyldimethoxysilane, (methacryloxymethyl)methyldiethoxysilane, (methacryloxymethyl)m- ethyldimethoxysilane, (methacryloxypropyl)methyldiethoxysilane, (methacryloxypropyl)methyldimethoxysilane, (methacryloxypropyl)dimethylethoxysilane, (methacryloxypropyl)dimethylmethoxysilane, and any combination thereof.

Element 8: Wherein the radical initiator is selected from the group consisting of an azo compound, a persulfate salt, a peroxide, a hydroperoxide, and any combination thereof.

Element 9: Further comprising a wellhead with a tubular extending therefrom and into the subterranean formation and a pump fluidly coupled to the tubular, wherein the step of: introducing the treatment fluid into the subterranean formation comprises introducing the treatment fluid through the tubular.

Element 10: Further comprising a wellhead with a tubular extending therefrom and into the subterranean formation and a pump fluidly coupled to the tubular, wherein at least one of the steps of: introducing the first treatment fluid into the subterranean formation and introducing the second treatment fluid into the subterranean formation comprises introducing the first and/or second treatment fluid through the tubular.

Element 11: Wherein the functional group is an amine silane group and the curing agent is a bisphenol A polyepoxy.

By way of non-limiting example, exemplary combinations applicable to A and B include:

A with 1; A with 2; A with 1 and 3; A with 2 and 3; A with 3; A with 4; A with 1 and 4; A with 4 and 5; A with 1, 3, and 5; A with 6; A with 6 and 7; A with 1, 3, 5, and 7; A with 6, 7, and 8; A with 9; A with 1, 3, 5, 7, and 9; A with 4 and 11; A with 4, 5, and 11.

B with 1; B with 2; B with 1 and 3; B with 2 and 3; B with 3; B with 4; B with 1 and 4; B with 4 and 5; B with 1, 3, and 5; B with 6, B with 6 and 7; B with 1, 3, 5, and 7; B with 6, 7, and 8; A with 10; A with 1, 3, 5, 7, and 10; B with 4 and 11; B with 4, 5, and 11.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
preparing a treatment fluid comprising an aqueous base fluid, functionalized proppant particulates, and a curing agent,
  wherein the functionalized proppant particulates comprise proppant particulates having a plurality of functional groups hydrolytically deposited thereon, wherein the plurality of functional groups includes up to 8 functional groups;
    wherein at least one functional group in the plurality of functional groups is an acrylyl silane group;
encapsulating at least one of the curing agent or the functionalized proppant particulates with an aqueous dissolvable coating so as to delay reaction between the curing agent and the at least one functional group in the plurality of functional groups on the functionalized proppant particulates,
  wherein an amount of the curing agent present in the treatment fluid is from about 0.1% to about 3% by weight of the functionalized proppant particulates and wherein the aqueous dissolvable coating permits diffusion of the curing agent thereby allowing the curing agent to contact the acrylyl silane group functional group on the functionalized proppant particulates;
introducing the treatment fluid into a subterranean formation having at least one fracture therein,
  wherein the functionalized proppant particulates and the curing agent are flowed into the aqueous base fluid as the aqueous base fluid is being introduced into the subterranean formation, thereby forming the treatment fluid on-the-fly;
placing the functionalized proppant particulates into the at least one fracture; and
forming a consolidated proppant pack in the at least one fracture by reacting the curing agent with the acrylyl silane group on the functionalized proppant particulates to consolidate the functionalized proppant particles in the at least one fracture.

2. The method of claim 1, wherein the curing agent is a radical initiator.

3. The method of claim 2, wherein the acrylyl silane group is selected from the group consisting of an acrylamide silane, an N-alkylacrylamide silane, an acrylate silane, (3-acryloxypropyl)trimethoxysilane, methacryloxypropyltrimethoxysilane, N-(3-acryloxy-2-hydroxypropyl)3-aminopropyltriethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropyltriethoxysilane, (3-acryloxypropyl)methyldimethoxysilane, (methacryloxymethyl)methyldiethoxysilane, (methacryloxymethyl)methyldimethoxysilane, (methacryloxypropyl)methyldiethoxysilane, (methacryloxypropyl)methyldimethoxysilane, (methacryloxypropyl)dimethylethoxysilane, (methacryloxypropyl)dimethylmethoxysilane, and any combination thereof.

4. The method of claim 2, wherein the radical initiator is selected from the group consisting of an azo compound, a persulfate salt, a peroxide, a hydroperoxide, and any combination thereof.

5. The method of claim 1, further comprising a wellhead with a tubular extending therefrom and into the subterranean formation and a pump fluidly coupled to the tubular,
wherein the step of: introducing the treatment fluid into the subterranean formation comprises introducing the treatment fluid through the tubular.

6. A method comprising:
preparing a first treatment fluid comprising a first aqueous base fluid and functionalized proppant particulates,
wherein the functionalized proppant particulates comprise proppant particulates having a plurality of functional groups hydrolytically deposited thereon, wherein the plurality of functional groups includes up to 8 functional groups;
wherein at least one functional group in the plurality of functional groups is an acrylyl silane group;
preparing a second treatment fluid comprising a second aqueous base fluid and a curing agent;
encapsulating at least one of the curing agent or the functionalized proppant particulates with an aqueous dissolvable coating so as to delay reaction between the curing agent and the at least one functional group in the plurality of functional groups on the functionalized proppant particulates,
wherein an amount of the curing agent present in the treatment fluid is from about 0.1% to about 3% by weight of the functionalized proppant particulates and wherein the aqueous dissolvable coating permits diffusion of the curing agent thereby allowing the curing agent to contact the acrylyl silane group functional group on the functionalized proppant particulates;
introducing the first treatment fluid into a subterranean formation having at least one fracture therein and placing the functionalized proppant particulates into the at least one fracture,
wherein the functionalized proppant particulates is flowed into the first aqueous base fluid as the first aqueous base fluid is being introduced into the subterranean formation, thereby forming the first treatment fluid on-the-fly;
introducing the second treatment fluid into the subterranean formation,
wherein the curing agent is flowed into the second aqueous base fluid as the second aqueous base fluid is being introduced into the subterranean formation, thereby forming the second treatment fluid on-the-fly; and
forming a consolidated proppant pack in the at least one fracture by reacting the curing agent with the acrylyl silane group on the functionalized proppant particulates to consolidate the functionalized proppant particles in the at least one fracture.

7. The method of claim 6, wherein the curing agent is a radical initiator.

8. The method of claim 7, wherein the acrylyl silane group is selected from the group consisting of an acrylamide silane, an N-alkylacrylamide silane, an acrylate silane, (3-acryloxypropyl)trimethoxysilane, methacryloxypropyltrimethoxysilane, N-(3-acryloxy-2-hydroxypropyl)3-aminopropyltriethoxysilane, O-(methacryloxyethyl)-N-(triethoxysilylpropyl)urethane, N-(3-methacryloxy-2-hydroxypropyl)-3-aminopropyltriethoxysilane, methacryloxymethyltriethoxysilane, methacryloxymethyltrimethoxysilane, methacryloxypropyltriethoxysilane, (3-acryloxypropyl)methyldimethoxysilane, (methacryloxymethyl)methyldiethoxysilane, (methacryloxymethyl)methyldimethoxysilane, (methacryloxypropyl)methyldiethoxysilane, (methacryloxypropyl)methyldimethoxysilane, (methacryloxypropyl)dimethylethoxysilane, (methacryloxypropyl)dimethylmethoxysilane, and any combination thereof.

9. The method of claim 6, further comprising a wellhead with a tubular extending therefrom and into the subterranean formation and a pump fluidly coupled to the tubular,
wherein at least one of the steps of: introducing the first treatment fluid into the subterranean formation and introducing the second treatment fluid into the subterranean formation comprises introducing the first and/or second treatment fluid through the tubular.

* * * * *